United States Patent
Bhojwani

(10) Patent No.: US 10,247,639 B2
(45) Date of Patent: Apr. 2, 2019

(54) PRESSURE INDICATOR FOR AUTOMOTIVE RADIATOR, SENSES A PREDEFINED PRESSURE AND FLAGS OFF A PERMANENT TRIGGER

(71) Applicant: Ravi Parmanand Bhojwani, Mumbai (IN)

(72) Inventor: Ravi Parmanand Bhojwani, Mumbai (IN)

(73) Assignee: Ravi Parmanand Bhojwani, Mumbai (IN)

( * ) Notice: Subject to any disclaimer, the term of this patent is extended or adjusted under 35 U.S.C. 154(b) by 160 days.

(21) Appl. No.: 15/411,967

(22) Filed: Jan. 21, 2017

(65) Prior Publication Data

US 2018/0209872 A1 Jul. 26, 2018

(51) Int. Cl.
*G01M 15/09* (2006.01)
*F01P 11/18* (2006.01)
*G01L 7/16* (2006.01)

(52) U.S. Cl.
CPC ............. *G01M 15/09* (2013.01); *F01P 11/18* (2013.01); *G01L 7/166* (2013.01)

(58) Field of Classification Search
CPC .. F01P 11/00; F01P 11/14; F01P 11/18; G01L 7/00; G01L 7/16; G01L 7/166; G01M 15/09
See application file for complete search history.

(56) References Cited

U.S. PATENT DOCUMENTS

| 2,673,464 A | * | 3/1954 | Zublin | G01L 7/063 116/212 |
| 4,198,869 A | * | 4/1980 | Mayernik | G01L 7/16 73/35.14 |

FOREIGN PATENT DOCUMENTS

GB 686887 A * 2/1953 ............. G01L 7/063

* cited by examiner

*Primary Examiner* — Nguyen Q. Ha

(57) ABSTRACT

The invention, a pressure indicator assembly is thread fitted onto a Radiator; the pressure indicator is designed to conduct 2 unique functions of sensing the pre-decided maximum sustainable pressure and communicating the same. Once the pre-decided maximum sustainable pressure of the Radiator is reached, a spring gets actuated and allows air (or steam) to flow inside the pressure indicator assembly. The air flow pushes an arrow head component; the top portion of the arrow head component shoots through a rubber retainer center hole into a visible transparent tube of the assembly. The retainer rubber and the transparent tube only allow partial passage of the arrow head component and entrap its base stem portion permanently, hence permanently flagging off the arrow head component. The flagged arrow head component is visible through the transparent tube, indicating the maximum pressure has been reached.

1 Claim, 1 Drawing Sheet

Original Position

Pressurised Position

Pressurised Position

Original Position

PRESSURE INDICATOR FOR AUTOMOTIVE RADIATOR, SENSES A PREDEFINED PRESSURE AND FLAGS OFF A PERMANENT TRIGGER

CROSS REFERENCE TO RELATED APPLICATION

The claimed invention does not have any reference. There is no similar application product available in the market.

BACKGROUND OF THE INVENTION

Automotive Radiators Manufacturers are thrust with claims of Radiator nonperformance. Whereas in some cases the pressure generated by the engine is far more than the defined sustainable pressure of the Radiator. Under such cases the Radiator bursts, but yet the claim has to be given as there is no evidence of surplus pressure.

BRIEF SUMMARY OF THE INVENTION

As stated above, in some cases the pressure generated by the engine is far more than the defined sustainable pressure of the Radiator. Under such cases the Radiator bursts, but yet the claim has to be given as there is no evidence of surplus pressure. The invention claimed here solves this problem.

A Pressure Indicator senses that a pre-decided maximum sustainable pressure of a Radiator has been reached and communicates the same by flagging off an arrow head component, which stays flagged permanently.

The objective of this invention is that any damage or malfunctioning to the Radiator after the indicator flags off would not be a responsibility of the manufacturer, as the predefined sustainable level of the Radiator has been crossed.

DETAILED DESCRIPTION OF THE INVENTION

Figure 2:
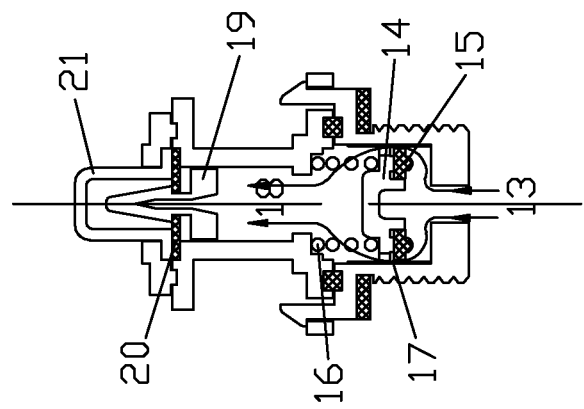
FIG. 2 denotes the Pressurized Position of the Invention.—When the pressure has reached the designed limit and the arrow head component is flagged off.

The Invention discussed here includes.

| | |
|---|---|
| 1. Thread Base | Plastic Molding; made of Poly amide |
| 2. Main Body | Molding; made of Poly amide |
| 3. Top Lid | Plastic Molding; made of Poly amide |
| 4. Transparent Tube or Case | Plastic Molding; made of Poly carbonate |
| 5. Spring Guide | Plastic Molding; made of Poly carbonate |
| 6. Lower Rubber Washer | Rubber Molding; material Red Silicon |
| 7. Compression Spring | Spring made of Stainless Steel |
| 8. Main Rubber Washer | Rubber Molding; material Nitrile |
| 9. Sealing Ring | Rubber Molding; material Nitrile |
| 10. Arrow Head Component | Plastic Molding; made of Poly amide |
| 11. Retainer | Rubber Molding; material Red Silicon |

Relationship Between the Components:

The Pressure Indicator comprises of 11 components, can be divided into 2 distinct functions: an actuating function and an indicating function. The actuating function sense a breach of a pre-decided pressure and the indicating function communicates by triggering off a flag.

The following is the description of the components, their fitment as an assembly along with their respective functions. The Pressure Indicator comprises of 1. Thread Base—this component is thread fitted onto the Radiator threaded insert at the bottom end and snap fits the main body at the top end. It also acts as a casing to the various internal components, which participate in the actuation function.

2. Main Body—this component is snap fitted to the threaded base at the bottom end. Back bone to the Indicative function of the Pressure Indicator. It encompasses the arrow head component and the retainer on the inside, allowing the arrow head component a passage to shoot off in a pressurized position and get griped or entrapped onto the retainer.

3. Top Lid—Is Joint at the bottom end with the main body, the top lid enables a placement of the transparent tube or case component.

4. Transparent Tube or Case—Ensures display of the arrow head component in the pressurized position and ensuring non-tampering of the assembly. If also keeps the retainer compressed at the base end, to ensure a leak proof joint. The transparent tube may have small holes for the coolant to discharge off.

5. Spring Guide—As the name suggests, it guides and locates the compression spring. Placed inside the cavity of the thread base has systematic gaps on the outer ring area to allow air to flow through.

6. Lower Rubber Washer—Part of the actuating function is placed between the spring guide and the internal base area of the thread base. To ensure a leak proof joint.

7. Compression Spring—Designed to ensure flagging at the pre-desired pressure is the heart of the actuating function. The spring compresses at reaching the Radiator's maximum sustaining pressure, allowing air to flow through.

8. Main Rubber Washer—Placed at an undercut of the thread base, helps seal a joint between the Pressure Indicator and a threaded insert of the Radiator.

9. Sealing Ring—Placed between the thread base and the main body ensuring a sealed joint.

10. Arrow Head Component—A Flag which gets activated and flagged off at reaching the pre-desired pressure. Placed in a cylindrical inside channel of the Main body and shoots off by pressurized air (or steam) and gets entrapped in the retainer.

11. Retainer—Is a Rubber Component with a hole in the center, Placed inside the main body top groove does a dual function of sealing a joint with help of the transparent case. More importantly and as the name suggests, it ensures entrapment of the arrow head component once the arrow head component is actuated so that the arrow head component does not retract back and stays flagged.

How the Invention Works:

The Pressure indicator is thread fitted onto a Radiator. The Radiator is pressurized and is designed to sustain certain pressure. Crossing the maximum sustainable pressure, the Radiator would burst, get damaged. The pressure indicator helps communicate when the maximum sustainable pressure of the Radiator has been reached.

The Pressure indicator is an assembly of 11 components conducting 2 unique functions of actuation and indication. The objective is to sense when the predefined pressure has reached by a predesigned compression spring and communicate the same with a flagging off the arrow head component, which stays flagged permanently.

Figure 1:
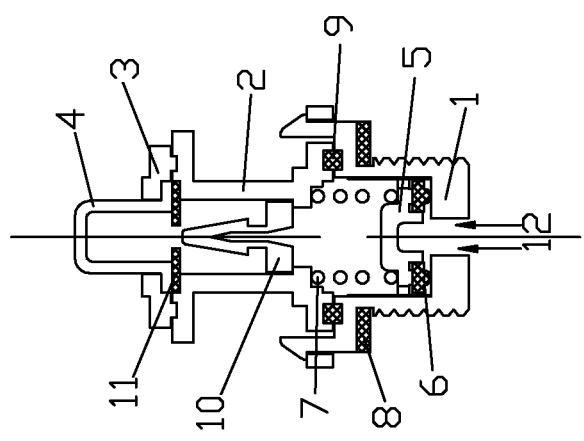
FIG. 1 denotes the Original Position of the Invention.— When the pressure has not breached the designed limit.

The Pressure Indicator in the original position as shown in FIG. 1 stays as is, the assembly of 11 components fitted as mentioned above. There is continuous pressure 12 being generated from inside the Radiator. The Main Rubber Washer 8 ensures sealing of the joint between the Pressure Indicator and a threaded insert of the Radiator.

Upon reaching a pre-defined pressure, the actuation process starts. As shown in FIG. 2, the compression spring 7/16 compresses and gets actuated along with the spring guide 5/14 and the lower rubber washer 6/15; the actuation function of the pressure indicator is now complete.

The actuation of the spring gives the air/steam flow a passage described by 13 and initiates an indicative stage. The Pressurized air flow pushes the arrow head component 10/19. The arrow head component 10/19 gets pushed upwards until it meets the rubber retainer 11/20. The Rubber Retainer is a rubber component with a hole in the centre. The hole is big enough to allow initial penetration of the arrow head component, but not big enough for the arrow head component to completely get through. The Rubber Retainer being a rubber component, on additional pressure allows the arrow head component to push itself forward, thus the top portion (the arrow head) passes through the rubber retainer's centre hole. The Transparent Tube does not allow the entire arrow head component to rocket up and restricts it. The Rubber Retainer on allowing the top portion of the arrow head component to pass retains its position and grips onto a stem portion of the arrow head component thereby entrapping the arrow head component thus not allowing the arrow head component to drop back even on gravity.

Thus the maximum pressure breach inside the radiator is communicated by flagging off the arrow head component and the same retains its flagged off position permanently. The Transparent Tube enables a visual display of the arrow head component thereby suggesting and communicating that the maximum pressure has been breached. Also the transparent tube enables that the flagged component is not manually tampered with.

How to Make the Invention:

The components of the Pressure Indicator are assembled in the described form. Then the entire assembly is thread fitted onto a threaded insert situated at the top of a radiator.

How to Use the Invention:

To use this invention, one needs to thread fit the pressure indicator onto the a radiator tank insert and let the indicator conduct its function.

What it claimed:

1. An indicator fitted on a radiator to sense a pre-decided maximum sustainable pressure of the radiator having been reached, wherein the indicator communicates that the pre-decided maximum sustainable pressure of the radiator has been reached by flagging off an arrow head component (10/19) of the indicator, the arrow head component (10/19) on its return gets trapped by a rubber retainer (11/20) in the indicator such that the arrow head component (10/19) stays flagged permanently.

* * * * *